United States Patent
Hirsch

[11] 3,712,595
[45] Jan. 23, 1973

[54] UPFLOW DISTRIBUTIVE TRAYS FOR FRACTIONATING COLUMNS AND ABSORPTION TOWERS

[76] Inventor: Abraham Adler Hirsch, 141 Norwood Street, Shreveport, La. 71105

[22] Filed: July 12, 1971

[21] Appl. No.: 161,748

[52] U.S. Cl. ............261/114 R, 261/114 A, 261/96, 23/270.5, 202/158
[51] Int. Cl. ............................B01d 3/18, B01d 3/22
[58] Field of Search ........23/270.5; 202/158; 261/96, 261/114 A, 114 JP, 114 VT, 114 R

[56] References Cited

UNITED STATES PATENTS 3,653,186   4/1972   McLendon ...........................261/114

Primary Examiner—Tim R. Miles
Assistant Examiner—Steven H. Markowitz

[57] ABSTRACT

The ascending phase, vapor in distillation columns, and vapor or the lighter of a pair of contacting liquids in an absorption tower flows unequally according to a velocity profile at points across the diameter of the vessel. This causes unequal distribution of vapor or rising liquid to the trays with attendant operating difficulties and inefficiency. A stack of perforated baffles or wire mesh discs of different overall diameters, with the largest at the top tapering to the smallest at the bottom, attached underneath each tray interpose a varied hydraulic resistance to counteract the velocity profile and hence equalize vapor or liquid upflow to all areas of each tray.

21 Claims, 6 Drawing Figures

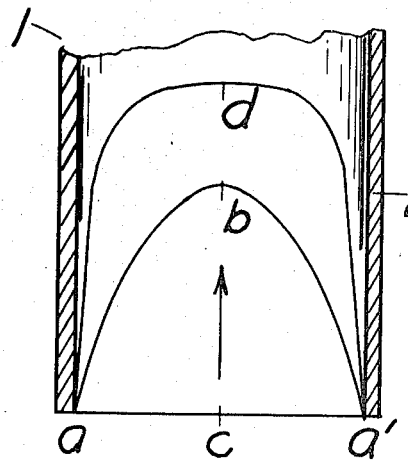
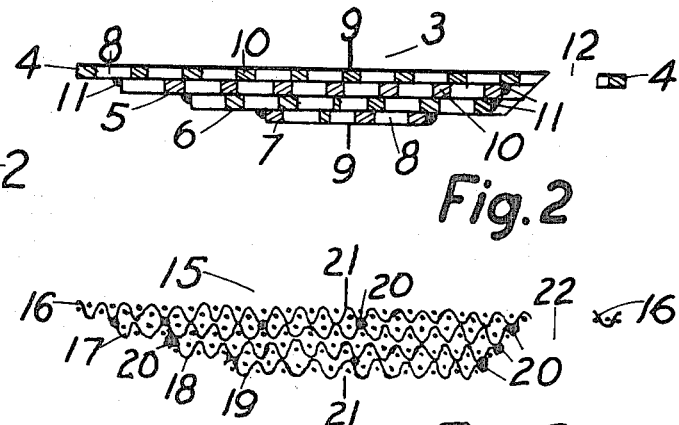
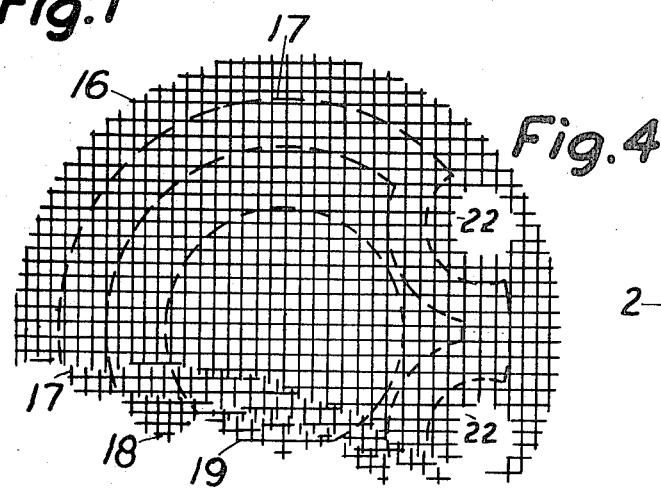
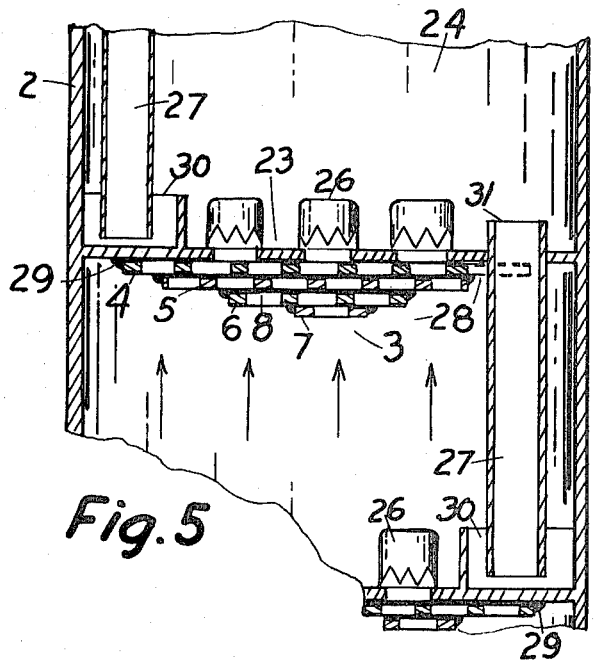
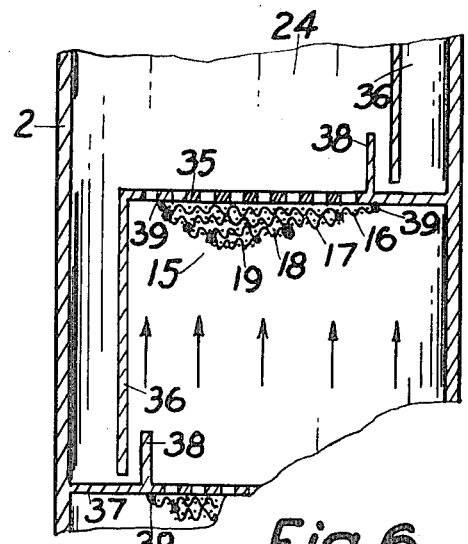

UPFLOW DISTRIBUTIVE TRAYS FOR FRACTIONATING COLUMNS AND ABSORPTION TOWERS

My invention relates to improvements in fractional distillation towers and similar two-phase fluid contacting apparatus whereby their mass transfer action on components in mixtures is enhanced.

BASIC PRINCIPLES

In the process of fractional distillation heated influx is introduced near the bottom of a separating tower. Vapors ascend through a series of perforate trays or bubble plates. On bubble plates vapors pass under bubble caps submerged beneath the surface of partial condensate on each tray in order to be contacted with the liquid phase. The liquid overflows a weir on each plate into a downcomer which empties into a pocket or seal on the plate below. Vapors arising after contact on each plate become richer in the more volatile components as they ascend through successively more volatile liquid pools until only the desired volatile component remains in the efflux vapor, which then passes on to a reflux or to a final condenser.

The same principles of vapor-liquid contact and separation of the volatile from the non-volatile components of a mixture of liquids apply to sieve plates as with bubble cap trays. Likewise, analagous principles apply to absorption towers in which solute is countercurrently transferred stage-wise on plates from a gas to a liquid or from a descending heavier immiscible liquid to an ascending lighter one.

PRIOR ART

Each tray is an integral stage in the enrichment process. Originally, all areas of a given tray were considered to perform uniformly but this belief was found erroneous and so the concept of "point efficiency" was introduced. The obviously uneven distribution of liquid over a plate caused by short circuitry, obstructive effects of the caps and hydraulic gradient as it flowed from the downcomer seal to the overflow weir leading to the plate below was suspected as a major reason on account of the variable depth of liquid and the consequent unequal length of path of bubbles. Consequently corrective steps were devised to minimize the variation in liquid elevation over a tray. Other improvements have been aimed toward moving the froth in the direction of the liquid stream to further equalize contact.

All of these advances were instituted with respect to the liquid phase, not once considering the distribution of the vapors, the phase which is decidedly the more voluminous and hence the more important; it had tacitly been assumed to be distributed uniformly, and was therefore utterly neglected.

NON-UNIFORMITY IN VAPOR DISTRIBUTION

A fractionating tower, essentially is a vertical, compartmented flow vessel through which a vapor travels between specialized walls, the plates, normal to the path of flow. Inasmuch as the openings on a plate for the most part are uniformly distributed they do not significantly affect the flow profile of the vapors taken across a diameter of the column except for the effects due to the variation in depth of liquid. As the vapors flow in either laminar or turbulent regime, depending on rating, there will be a velocity profile across the vessel, the highest value being at the center, decreasing to the lowest caused by skin friction at the walls. Accordingly, more vapor volume pushes through the centrally-located bubble caps or openings than through those in the peripheral areas. Furthermore, the higher vapor velocities bubbling through the central caps blow back the liquid phase toward the shell, increasing its depth around the edges with consequent reduction of vapor passage. Also the blast of vapor at the center of the plate piles up a dome of froth and sprays droplets of liquid into the influx to the next higher plate, thereby reducing the separating efficiency. As an overall result of higher vapor velocity coupled with reduced time of contact the central areas of the column are overworked volumetrically and under-productive transfer-wise. On the contrary, the circumferential caps in generaly have deeper liquid cover with less bubbling, hence better approach to equilibrium but reduced throughput.

Although short circuiting of the liquid on a plate has been recognized and corrections attempted as mentioned before, the detriment of poorly distributed vapor has been completely unsuspected. It was only the visibility of a transparent pilot column that exposed evidence of this deficiency. Photographs show a dome of froth centered above the tray, arching down to its smallest thickness at the edge. The phenomenon of unequal upflow can be observed in commonplace laboratory apparatus. In ASTM distillations of gasoline in Engler flasks, when only heavy ends remain these vaporize as puffs of smoke and burst parabolically upward into the neck of the flask. There is a stagnant layer between these plumes and the walls. In laboratory columns having perforated plates and a central downcomer the bubbling action can be observed to be more active through the orifices the greater their distance from a boundary, that is, the walls and the downcomer. In this apparatus ascending traffic prefers the intermediate orifices.

Evidently this unequal distribution of vapor flow seriously detracts from the efficiency of a fractionating column with respect to quality of product, rate of production, flexibility of operation, hold up, amount of heat consumption, response to control and overall return on investment.

Noting these important, basic faults in the design of fractionating towers, it is an object of this invention to provide means to equalize the upward movement of vapor to all parts of a vapor-liquid transfer stage and by so doing improve mass transfer action and overall performance. Likewise, it is another object of this invention to equalize the flow of ascending fluid through a countercurrent absorption tower constructed with sieve plates or bubble trays wherein the two phases may be either a gas and a liquid or two immiscible liquids of diffenent densities.

In cases where correction to disparities in upflow has been attempted by other means with only partial success, the necessary auxiliary adjustments for attaining equalized flow can be economically provided by adapting the subject control method to the existing velocity profile. Its application does not require complete structural revision of the equipment. It is therefore another object of my invention to describe a means for economically supplementing other efforts at equalizing upflow distribution.

In existing sieve tray columns some degree of weeping, the downflow of liquid through the small openings intended solely for vapor ascension is always present. This has been attributed to variable depth of liquid and to sloshing over the plate. However, the fundamental cause of this fault is the uneven distribution of vapor velocities under the plate. It is an object of this invention to significantly reduce weeping and dumping of the liquid phase by uniformly distributing the approach of vapors underneath the tray.

Since weeping is especially noticeable at low rates its correction will enable a sieve plate tower to be operated at lower ratings, and thereby process smaller quantities of material. Another object of this invention, then, is to extend the lower operating range of a sieve plate type tower. Furthermore, since slower throughput will promote better mass transfer, the quality of the product will be improved by more complete separation of components. Therefore, a still further object of this invention is to improve the degree of separation in a sieve plate tower.

Bubble cap type trays are at present subject to flooding, especially at high ratings. In this condition liquid overflows the riser or nozzle under the dome of the caps and drops to the plate below. With some cases liquid piles up at the entrance area caps, sealing these to vapor hydrostatically and dumping to the lower plate while the exit area caps, near the overflow weir, blow off vapor with little or no vapor-liquid contact. This condition is largely a result of poor vapor distribution underneath the tray. Hence, an object of this invention is to correct flooding by uniformly distributing the vapor flow under the trays. As flooding is corrected at normal operating rates, an increase in capacity results, hence, an additional object of this invention is to increase the throughput possibilities of bubble cap type columns.

SUMMARY OF THE INVENTION

The present invention makes the upflow of vapor in a fractional distillation column or of ascending fluid in an absorption tower uniform across its diameter by inserting a graded hydraulic resistance underneath each tray to counter the tendency toward nonuniformity of the uncontrolled transverse velocity profile. These resistances are baffles which pose their greatest resistance to upflow at the center of the column and become less obstructive toward the shell. Structurally, each baffle is a stack of perforate plates or wire mesh discs, all of different overall diameters, attached underneath each tray with the largest disc on top, and the smaller sizes in order downward. Resistance to upflow is then influenced by the length of strictured path the vapor must travel immediately in advance at any point on the tray.

Since a downcomer imposes frictional resistance to the rise of vapors in much the same manner as does the shell of the tower the uniformizing baffles similarly taper in flow resistance away from their location. In cases where previous flow control has been attempted without satisfaction, this same principle of tapered resistance is applicable reciprocally with respect to the velocities found on a traverse.

REFERENCE TO DRAWING

The drawing shows the structure of my flow uniformizing baffles and their application to distillation and to absorption tower trays. The separate views are:

FIG. 1 is a graph showing the velocity profile across the diameter of a conduit for a fluid flowing upwardly, FIG. 2 a section through a uniformizing baffle consisting of a stack of perforated plates, FIG. 3 a section through a uniformizing baffle consisting of a stack of open mesh plies, FIG. 4 a plan view of the baffle of FIG. 3, FIG. 5 a vertical section through a typical portion of a bubble cap tower showing the perforated plate baffle of FIG. 2 mounted underneath a tray, and FIG. 6 a vertical section through a typical portion of a sieve tray column with an open mesh flow distributive baffle as in FIG. 3 attached underneath a tray.

SPECIFIC FIGURES

Referring now to each sketch: FIG. 1, taken from the textbook "Unit Operations" by G. G. Brown et al., John Wiley & Sons, New York, 1955, page 139, FIG. 124, shows the distribution of velocities for fluids in a circular conduit, and illustrates the velocity profile in vapors rising up a distillation column 1. Velocities vary across diametrical baseline $aca'$ as indicated by the ordinates of the curves $aba'$ and $ada'$. At low velocities flow is laminar and the parabolic arc $aba'$ describes the variations; at high rates flow is turbulent and a curve of form $ada'$ applies. At intermediate rates of flow the velocity profile lies between arcs $aba'$ and $ada'$. In all cases velocity is zero at the wall 2 and a maximum at the center $c$. This inherent variation in vapor velocity across a column causes non-uniformity in gas-liquid contact over a plate, blowing an excessive amount of vapor through the central area and a deficient volume through the distal portions. A similar effect is caused by the presence of other boundary surfaces, particularly the downcomers.

FIG. 2 shows sectionally a vapor distributing baffle 3 consisting of a stack of substantially rigid plates 4, 5, 6 and 7 each of different overall diameters decreasing vertically downward so as to provide longer vapor flow paths through openings 8 toward the center 9 than near the edges. Each of the openings 8 are quite larger in area than the metal stock 10 inbetween so that when stacking together a given ply cannot completely block the flow of vapor into the ply above. The layers are fastened together by conventional means, such a welding at spots 11 along their edges. An opening 12 is allowed for spacing around a downcomer, an eccentric one in this illustration. The edges of the lower plies 5, 6, 7 lie progressively further from the downcomer position as they do from the wall of the column.

FIG. 3, a section, shows the construction of a vapor uniformizing baffle 15 made with substantially rigid wire mesh. Several plies, 16, 17, 18 and 19, all of different overall diameters, are fastened together by some means, such as by welds 20 in order of decreasing overall diameter downward, symmetrical with the central axis 21 of the vapor passages. A tapered space 22 is allowed for an eccentric downcomer. The edges of the lower plies lie progressively further from the downcomer location.

The baffles of FIGS. 2 and 3 are generally circular in plan to conform to the cylindrical shape of the column. Part of their outline will parallel incidental features, particularly the configuration of the downcomers.

FIG. 4, the plan view of the uniformizing baffle of FIG. 3, shows by cut-a-way the receding arrangement radially of the separate plies 16, 17, 18 and 19. Details of the tapered cut-out 22 from each of the plies to avoid a downcomer is shown.

FIG. 5 shows in section the application of a perforated plate equalizing baffle 3, as in FIG. 2, to bubble cap shelves 23 in a fractional distillation column 24. Vapor rises up column 24 through the staggered perforations 8 of the uniformizing baffle 3 into the nozzles (not shown) inside bubble caps 26. In the illustration the tubular downcomers 27 are spaced circumferentially around the tray 23. The baffle assembly 3 is spaced horizontally by indentations 28 from the downcomers so as to leave distance in the same manner as from the shell 2. The plies are thus symmetrical to the actual phase transfer section of the plates. Actually the top plies should follow the outlines paralleling the shell and the downcomers, but the lower plies need not reproduce these outlines in such detail.

The baffle is attached to the bubble plate by any well recognized means, such as a ring of welds 29, or by bolting or riveting. A downcomer seal 30 and an overflow weir 31 regulate the height of the liquid flowing over the tray 23.

The equalizer baffle 3 prevents the concentration of vapor upflow through the centrally placed bubble caps and distributes the vapors evenly under the whole plate as indicated by the arrows.

FIG. 6 shows in section the application of a vapor flow-equalizing baffle 15, as in FIG. 3, made of open mesh material, such as discs of wire mesh, 16, 17, 18 and 19 to a sieve tray 35. The edges of the top discs 16, 17 of the baffle avoid the shell 2 and the chord-like downcomer 36. The blanked area 37 under the downcomer seal 38 need not be baffled since there is no upflow through this spot. The outline of the plies is symmetrical with the phase transfer portion of the tray. The baffle 15 is attached to the sieve tray 35 by means of welds 39, or any other convenient methos such as with J-bolts. The upflow of vapors is equalized beneath the sieve tray 35 as indicated by the uniform set of arrows.

In both the cases of baffles as shown in FIG. 5 and 6 the resistance to vapor passage taken along a diameter is varied by changing the length of flow path and the number of associated strictures through the plies. This variation in resistance conforms to the velocity profile in FIG. 1, the greater the velocity at a point along a diameter, the larger the resistance interposed by the baffle. Each ply overlaps the one below. Thus the maximum thickness of plies is at the center of the column or the axis of flow and the thickness tapers to zero near the shell of the tower and near the downcomers.

FURTHER DISCUSSION

For some bubble cap trays the cap height is varied to correspond to the liquid gradient between the downcomer seal and the overflow weir. In this case the application of the vapor flow uniformizing baffles of FIGS. 2 and 3 will further promote smooth operation by equalizing the vapor upflow across the column.

Whereas illustrations show the uniformizing baffles affixed directly underneath the tower shelves, they also may be installed with a narrow space between them, provided the distance from the top of the baffle to the bottom of the tray is small compared to the spacing between trays. Construction is simpler when attaching the uniformizing baffles directly to the trays as illustrated in the sketch, FIGS. 5 and 6.

Either the open mesh sieve baffles or the perforated plate baffles may be used underneath a bubble cap type of tray to distribute the ascending vapors uniformly since here the openings in the baffle being quite smaller than those on the tray can govern the partition of flow to the various nozzles under the caps. However, with sieve plate columns the open mesh vapor uniformizing baffle is preferred since if a perforated baffle were used the openings necessarily would be very numerous and quite small in order not to blank out sections of the tray.

The sketches all show the plies of the baffle to have openings over their entire area. In the case of bubble cap trays the same effect in equalizing upflow is attainable if the openings through the plies of a perforated plate baffle are restricted to those areas under and closely contiguous to the nozzles feeding each bubble cap.

When upflow rates are very high the diametrical distribution of velocities resembles curve $ada'$ of FIG. 1. For this case the stack of distributing baffles may be simplified to a single ply fastened under a tray. For this condition the velocity profile, except near the boundary surfaces, is nearly uniform and hence requires no further correction. Therefore spacing is left along the edges of the baffle at a distance from the shell of the column and the downcomer.

The existance of a hydraulic gradient in the liquid flowing over a tray can complicate the pattern of openings in a perforated baffle or the several overall diameters in the stack of wire mesh discs, or their size of mesh. Complication is a minimum with trays which are equipped for uniform liquid depth, such as bubble caps that are adjustable for equal submergence of bubble escape edges or for any tray sloped in the direction of liquid flow.

I claim:

1. An upflow uniformizing baffle for fractional distillation columns, absorption towers and similar mass transfer apparatus in which two distinct phases, at least one of them a liquid, are contacted countercurrently, the lighter of said phases ascending said column, stagewise contact between said two phases being provided on substantially horizontal trays spaced at intervals along the height of said column, openings in said trays for ascent of said lighter phase and its contact with the other phase, said uniformizing baffle comprising a stack of plies of substantially rigid sheets secured underneath said trays, strictured openings through said sheets for upflow of the ascending phase through said plies to said trays, said openings in the uppermost of said plies registering at least partially with the said openings in said trays, each said ply in said stack being of different overall diameter, the largest being the top ply placed proximal to said tray, the next to largest ply being placed underneath said top ply, and so on in order of decreasing overall diameter to the ply of smallest overall diameter on the bottom of said stack which arrangement of said plies varies the resistance to upflow through various parts of said tray in a manner to attain uniform distribution of the ascending phase through said column, means for fastening said plies of said stack together and means for affixing said stack underneath said tray.

2. The upflow uniformizing baffle of claim 1 installed in a fractional distillation column in which the ascending phase is a vapor, said openings on said trays therein being for passage of vapor.

3. The upflow uniformizing baffle of claim 2 in which said openings on said plies are located in the vicinity of said vapor passages of said tray.

4. The upflow uniformizing baffle of claim 3 in which said plies are geometrically similar in outline to the mass transfer section of said trays and are symmetrically arranged with respect thereto.

5. The upflow uniformizing baffle of claim 1 in which said plies are perforated plates.

6. The upflow uniformizing baffle of claim 1 in which said plies are open mesh material.

7. The upflow uniformizing baffle of claim 6 in which said open mesh material is a wire mesh.

8. The upflow uniformizing baffle of claim 1 in which said plies are held together with surfaces in contact.

9. The upflow uniformizing baffle of claim 1 in which a narrow spacing is allowed between at least two of said plies.

10. The upflow uniformizing baffle of claim 1 in which the top ply of said baffle contacts the underside of said tray.

11. The upflow uniformizing baffle of claim 1 in which a narrow spacing is allowed between the top ply of said baffle and the underside of said tray.

12. The upflow uniformizing baffle of claim 1 in which the edge of said top ply is spaced from the shell of said column.

13. The upflow uniformizing baffle of claim 1 installed in a tower in which a liquid phase descends through downcomers, said top ply of said baffle being spaced from the shell of said tower and from said downcomers.

14. The upflow uniformizing baffle of claim 13 installed in a tower wherein said downcomers terminate in a liquid seal on said trays, said top ply of said baffle being blanked under the position of said liquid seal.

15. The upflow uniformizing baffle of claim 1 installed in towers in which said trays have bubble caps.

16. The flow uniformizing baffle of claim 1 installed in towers in which said trays are perforated plates.

17. The flow uniformizing baffle of claim 1 installed in towers in which said trays are open mesh sieves.

18. Apparatus comprising at least one upflow distributive baffle mounted in a fractional distillation column, absorption tower or similar mass transfer apparatus in which two distinct phases, at least one of them a liquid, are contacted countercurrently, the lighter of said phases ascending said column, stage-wise contact between said two phases being provided on trays spaced at intervals along said column, said baffle being a single ply of substantially rigid sheet secured underneath at least one of said trays, openings in said baffle for upflow of the ascending phase to said at least one tray, and a spacing between the edge of said baffle and the shell of said column sufficiently wide to accommodate flow of the lighter phase around the baffle and through the outermost openings in said tray.

19. The uniformizing upflow distributive baffle of claim 18 in which said column is provided with downcomers and spacing is provided between edges of said rigid sheets and said downcomers.

20. The uniformizing baffle of claim 18 in which said rigid sheet is a perforated plate.

21. The uniformizing baffle of claim 18 in which said rigid sheet is a wire mesh.

* * * * *